United States Patent [19]

Diethorn

[11] Patent Number: 5,548,642
[45] Date of Patent: Aug. 20, 1996

[54] OPTIMIZATION OF ADAPTIVE FILTER TAP SETTINGS FOR SUBBAND ACOUSTIC ECHO CANCELERS IN TELECONFERENCING

[75] Inventor: Eric J. Diethorn, Morristown, N.J.

[73] Assignee: AT&T Corp., Murray Hill, N.J.

[21] Appl. No.: 363,675

[22] Filed: Dec. 23, 1994

[51] Int. Cl.⁶ .................................................. H04M 9/08
[52] U.S. Cl. ........................ 379/410; 379/406; 379/407; 379/411; 370/32.1
[58] Field of Search .................................. 379/410, 402, 379/406, 408, 411, 412, 407; 370/32.1; 395/2.4, 2.5; 381/41, 46, 47

[56] References Cited

U.S. PATENT DOCUMENTS 5,272,695  12/1993  Makino et al. ......................... 379/410
5,371,789  12/1994  Hirano .................................... 379/410
5,408,530   4/1995  Makino et al. ......................... 379/410

OTHER PUBLICATIONS

"Acoustic Echo Cancellation Using Multirate Techniques" Perex and Amano, IEICE Trans. V. E. 74, No. 11, Nov. 1991.

*Primary Examiner*—Jeffery Hofsass
*Assistant Examiner*—Jacques M. Saint-Surin

[57] ABSTRACT

A subband acoustic echo canceller for a telecommunications teleconferencing room is equiped with subband adaptive filters and filter taps associated with said subbands. A data store is provided containing a weight list for controlling allocation of the filter taps among the subbands. An optimum tap profile as determined by the weights is a composite of room acoustic impulse response and weighting adjustments based on one or more measures of perceived human acoustic sensitivity experienced by far-end users. An active periodic adjustment of the weights responsive to detection of sibilant energy in the incoming path further improves echo cancellation. Active measurement and updating of the room acoustic impulse response provides further refinement.

9 Claims, 8 Drawing Sheets

OPTIMIZATION OF ADAPTIVE FILTER TAP SETTINGS FOR SUBBAND ACOUSTIC ECHO CANCELERS IN TELECONFERENCING

FIELD OF THE INVENTION

This invention relates to subband acoustic echo cancellation in telecommunications speech teleconferencing systems; and more specifically to a novel scheme for choosing the number of taps in the adaptive filters used in such systems based on weighting functions which are a composite of both physical and human perceptual sensitivity factors.

BACKGROUND OF THE INVENTION

In modern full-duplex teleconferencing systems, subband acoustic echo cancellers are used to cancel reverberant sound incident at the local room microphone, thus to avoid the far end user having to hear echoes of his/her own voice. These devices model the character of the open air sound paths between the microphone and the loudspeaker, by decomposing the wide-band speech signals into several disjoint subbands each associated with an independent adaptive filter; and developing an impulse response function for each subband to emulate the component of the room impulse response contained within each subband.

A subband acoustic echo canceller contains a number of adaptive filter "taps" that are allocated among the subbands. The allocation can be uniform (same number of taps in each band); or nonuniform. The maximum number of feasible taps as summed over all subbands is a known function of the real-time processing capability of the hardware employed in the echo canceller. Given this constraint, it is critical that the feasible number of taps be distributed over all subbands in some kind of optimized filter tap "profile" calculated to remove the maximum possible reverberent acoustic energy. A typical tap profile may, for example, be based on an assessment of maximum echo path compensation capability vs. subband (i. e., frequency) number. This type of tap profile is derived from data reflecting known gross characteristics of typical room acoustic impulse response functions, which takes into account the fact that the magnitude of the response decays with increasing time and increasing frequency. Using this approach, it has been common practice in setting the echo canceller filter tap profiles to simply allocate most of the taps to the lower-most subbands, with the tap allocation in each subband decreasing roughly exponentially with increasing subband number. This allocation "weights" the lower frequencies with more filter taps in those subbands; and is carried out using a table of tap counts stored in the subband acoustic echo canceller.

One shortcoming of this traditional tap allocation and weighting scheme is the absence of any indicia of human perceptual phenomena in the weightings. These phenomena significantly affect the degree to which components of the echo are actually perceived by and annoy the far-end talker.

SUMMARY OF THE INVENTION

An approach is herein described for incorporating indicia of human perceptual phenomena into the adaptive filter tap allocation table, or profile, of a subband acoustic echo canceller that is widely applicable to most users. This invention recognizes in particular that a critical factor in whether or not an echo will be perceived by the far-end speaker is the relative perceived loudness of reverberating speech as produced by the near-end teleconference room.

In one embodiment, the invention provides adaptive filter tap profiles for a subband acoustic echo canceller that are a function of both the room's physical acoustic attributes and human perceptual sensitivities relating to the quality of perceived speech loudness. Data on the relative power spectrum for male and female speakers is incorporated into the tap weighting function, to concentrate taps in the peak energy containing lower subbands. In a variation of this idea, the tap profile may be further optimized by responding in the short term to components of transitory unvoiced speech, and in particular sibilants ("s" sounds). These speech components exhibit power in the frequencies above 2 kHz that is comparable to the peak relative power levels found in the lower-most subbands of the long-term male/female speech power spectrum. Reverberant energy generated in the room during teleconferencing by these sibilant components may therefore be removed more effectively by actively shifting the tap profile to favor the upper-most bands.

Other and further variations of the present tap optimization improvements are described herein below.

DETAILED DESCRIPTION OF AN ILLUSTRATIVE EMBODIMENT

Figure 1:
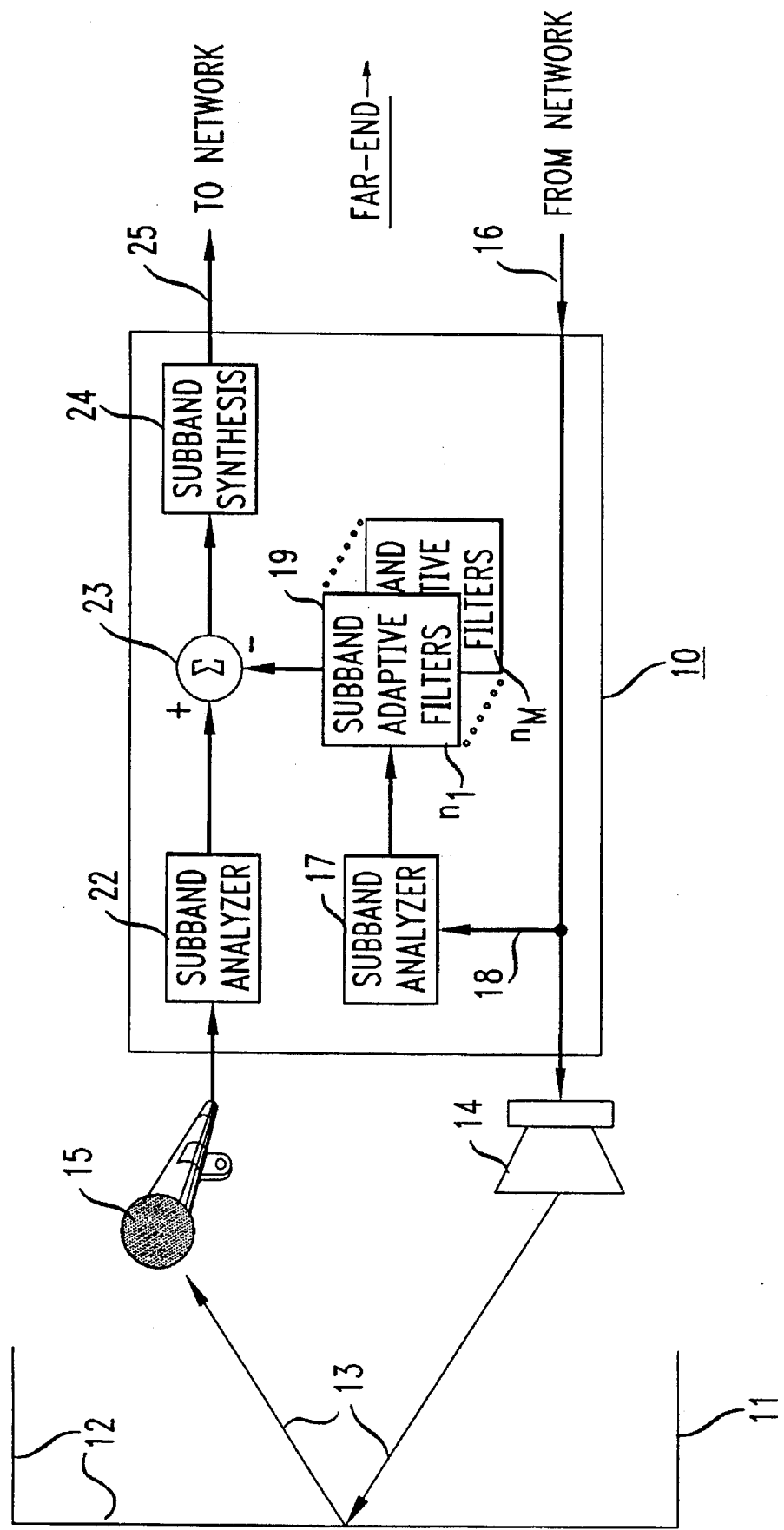
FIG. 1 is a functional diagram of a generally conventional subband acoustic echo canceller deployed in a teleconference room setting.

FIG. 1 shows a generalized subband acoustic echo canceller 10 operating in a room 11 which may be a teleconferencing room. Canceller 10 is serially connected to a telecommunications network (not shown) through incoming line 16 and outgoing line 25. Room reverberative surfaces 12 define multiple echo paths which depend on room geometry; one such path denoted 13 is shown. Speech from the far-end emanating from room loudspeaker 14 travels along path 13 (and others); and enters microphone 15 with various time delays. Canceller 10 contains conventional adaptive elements including subband analyzer 17 connected to incoming path 16 via line 18, and room subband analyzer 22 connected to microphone 15. Subband adaptive filter bank 19 contains a plurality of filter taps denoted $n_1 \ldots n_M$, where M is the number of discrete subbands. The room subband analyzer 22 is set up to have the same subband structure as that of analyzer 17. Analyzer 22 receives signals from microphone 15 which include the undesired echoes of the far-end speech. The desired output of filter 19 is a set of signals which, based on the assumed impulse response of the room 11 and the feasible number of filter taps in the profile and their weightings as summed over all subbands, optimally subtractively combines with the output of analyzer 22 in summer 23. The resultant signals containing reduced far-end speaker echo energy content are fed to subband synthesizer 24 which resynthesizes the full-band outbound (transmit) speech signal from the echo-cancelled subband signals. The relatively echo-free signal is transmitted to the network via outgoing signal path 25. A more detailed description of adaptive filters used in acoustic echo cancellers may be found, for example, in the article "A Twelve-Channel Digital Voice Echo Canceller", D. L. Duttweiler, IEEE Trans. Comm., COM-26, No. 5, May 1978, pp. 647–653, which pages are hereby incorporated by reference.

Figure 2:
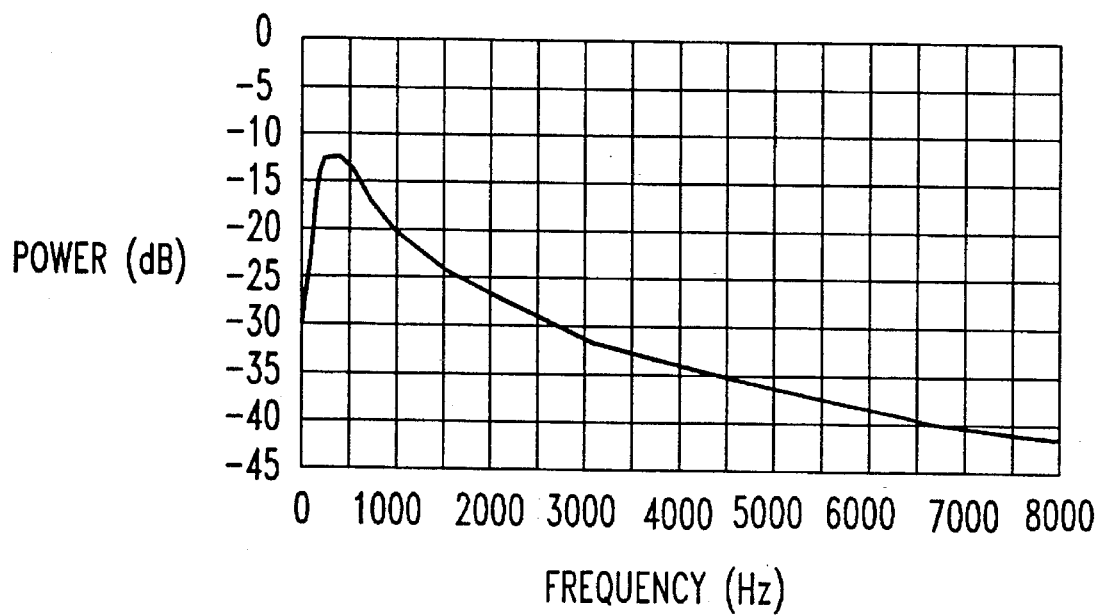
FIG. 2 is a graph presenting a long-term composite relative speech power spectrum for men and women.

Echoes are manifest only in regions of the audio spectrum for which the received far-end signal provides excitation. Where the far-end signals are speech, the known long-term characteristics of speech can in accordance with the invention allow an improvement in the shaping of the tap profile. FIG. 2 illustrates the relative power spectrum of speech for a composite of male and female speakers. The curve shows that the region below 1000 Hz contains the large preponderance of speech energy. The tap profile can therefore be improved, i.e., optimized, by a loudness filter tap weighting function concentrated in this region.

One approach for realizing a loudness weighting function is illustrated hereinafter, in the framework of a "least squares" optimization technique. It should be understood, however, that the profile optimization may also be cast in other frameworks, such as in an integer linear programming problem.

For an M-subband tap profile, let i, i=1, 2, 3, ... M, denote the subband index; and let $d_i$ denote the number of taps in the ideal or desired filter tap profile for subband i. The desired profile $\{d_1, d_2, \ldots, d_M\}$ is that derived, or measured from, the physical acoustic nature of the near-end room.

The constrained least-squares minimization problem is expressed as follows:

$$\min_{\{n_i: i=1,\ldots,M\}} \sum_{i=1}^{M} w_i(d_i - n_i)^2 \quad (1a)$$

subject to the two constraints $$n_i >= 0, \text{ for all } i, \quad (1b)$$

$$\sum_{i=1}^{M} n_i = N_T \quad (1c)$$

In the preceding, the terms $\{n_i\}$ are the optimum subband filter tap counts for minimizing the weighted squared-error functional in (1a), subject to the non-negativity and profile size constraints in (1b) and (1c). The weights $\{w_i\}$ are "importance" factors used to control the relative error in the solution as a function of subband number; and in the present invention are composites of both physical and perceptual factors.

Formulated in this manner, the optimum filter tap profile may be obtained as the solution to a constrained integer quadratic programming problem, an exposition of which is found in *Optimization by Vector Space Methods*, D. G. Luenberger, John Wiley & Sons, Inc., New York, 1969. This publication to the extent relevant is hereby incorporated by reference.

Although numerical procedures are known in the art for solving a constrained integer quadratic programming problem, a closed-form solution particularly advantageous in the present context of optimization of adaptive filter tap profiles for subband acoustic echo cancellers may be realized by making a simplification. Specifically, real (floating point) numbers are substituted for the integer subband tap counts $n_i$. Then, once optimal real numbers $n_i$ are determined, they are rounded to integers and resolved with constraint (1c) above. With real numbers substituted for the $n_i$, the solution to the term (1a) follows readily from the theory of constrained optimization of convex functionals in accordance with the above-cited publication.

The realizing of a composite weighting function in accordance with the invention using the least-squares optimization technique, is next described.

Figure 3:
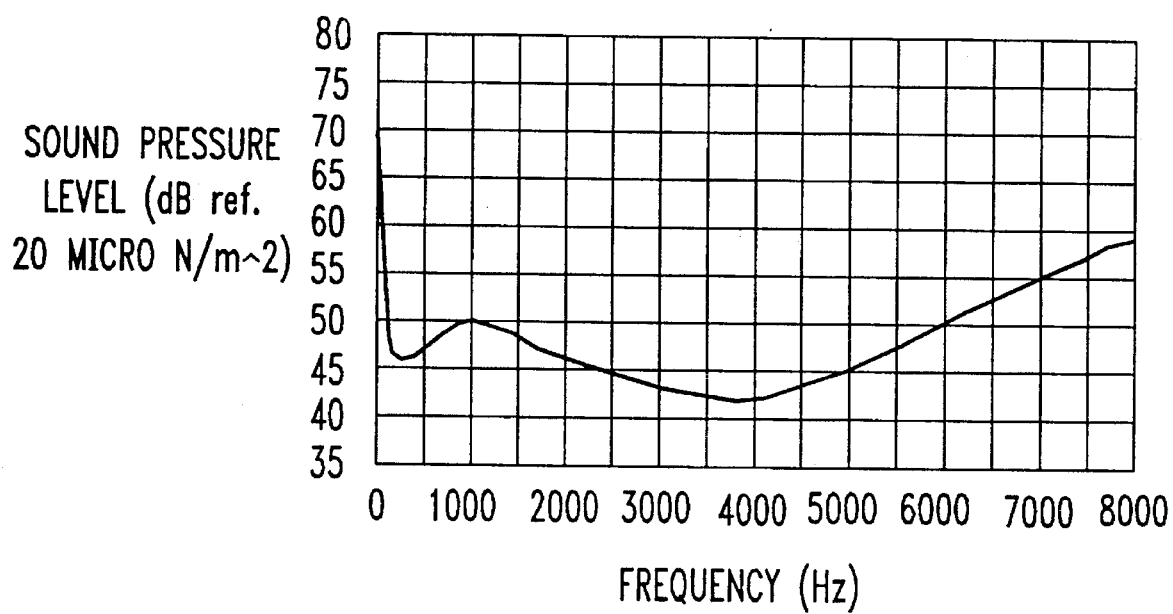
FIG. 3 is a graph presenting an equal loudness contour of human hearing.
Figure 4:
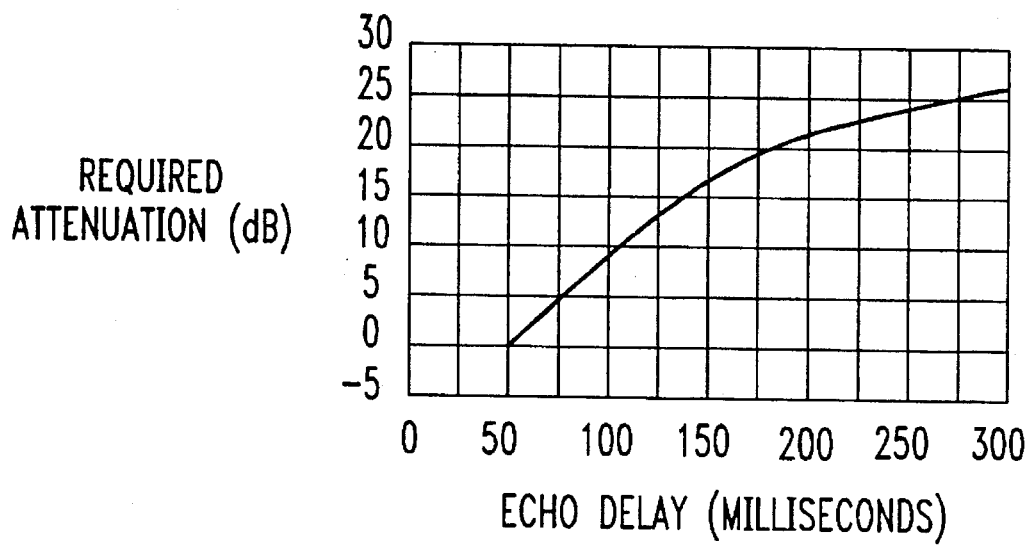
FIG. 4 is a graph presenting a generally accepted measure of the echo attenuation required to meet a 20% annoyance level.

FIG. 3 shows a graph of the equal loudness contour of human hearing, calibrated to a 50 dB-sound power level ("SPL") source at 1000 Hz. FIG. 4 shows the echo attenuation required to meet a generally accepted 20% annoyance level. For a given echo delay, the ordinate value indicates the required attenuation in decibels of an echo, relative to its source, so as not to annoy more than 20% of a population. Both FIGS. 3 and 4 are found in *Sound System Engineering*, by D. Davis and C. W. Davis, H. W. Sams & Co., Carmel, Ind., 1987.

When expressed in terms of relative power, the sensitivity curves of FIGS. 2–4 convey differences in sound pressure level. Important to the ear of the far-end user, however, is the perception of loudness of one sound relative to another. One generally accepted loudness relation for human hearing, also published in Davis et. al., holds that each 10 dB increase (or decrease) in SPL of a sound source increases (or decreases) the perceived loudness by a factor of two. For two levels $l_1$ and $l_2$ measured in dB-SPL, the change in loudness in going from level $l_1$ to level $l_2$ is therefore:

$$\text{Change in Loudness} = 2^{(l_2 - l_1)/10} \quad (2)$$

Figure 5:
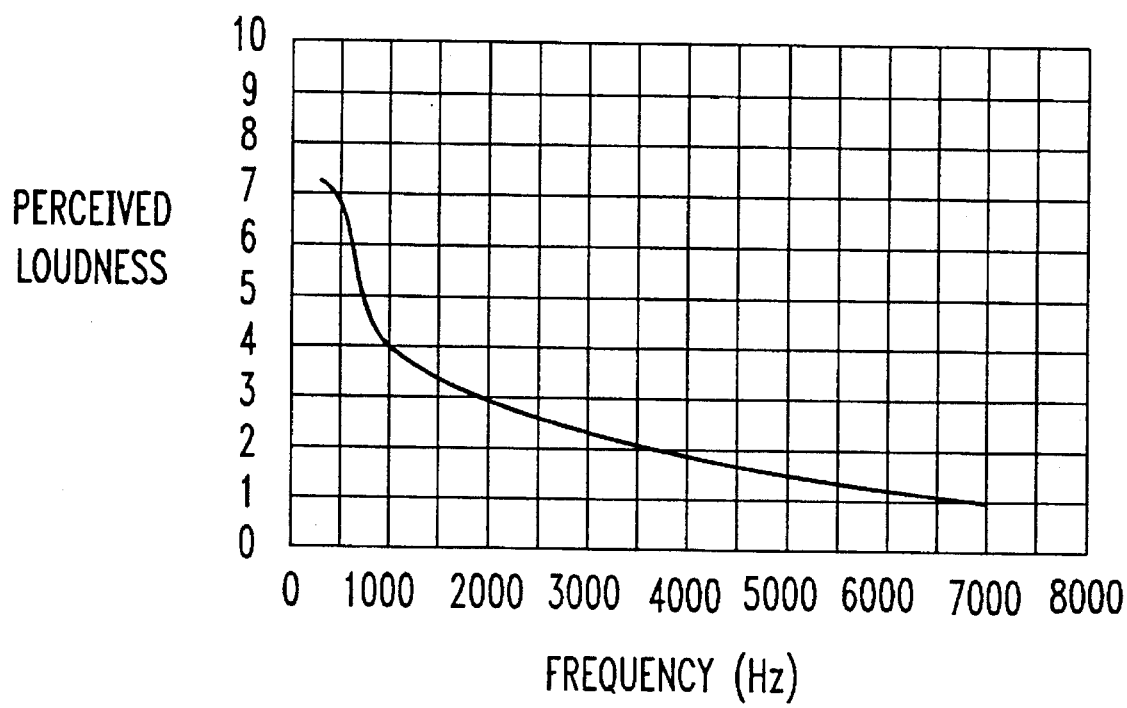
FIG. 5 is a graph of a specific tap corresponding to long-term composite speech loudness transformation, and comprises a loudness transformation of the graph of FIG. 2.
Figure 6:
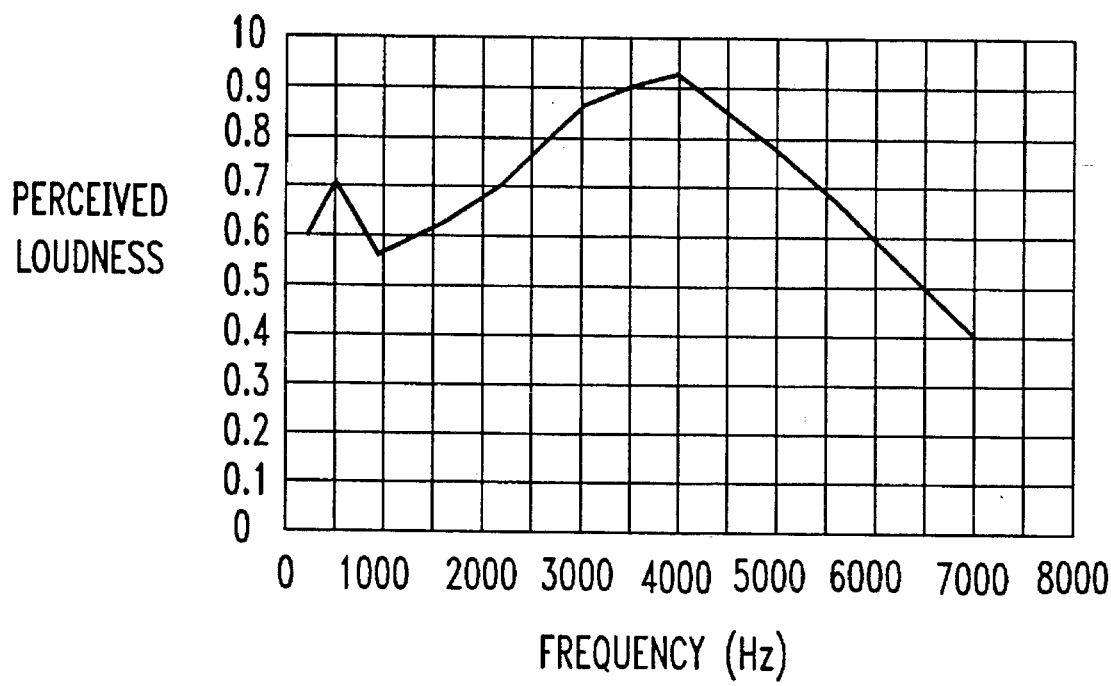
FIG. 6 is a graph of a tap corresponding to the loudness curve of human hearing, and comprises a loudness transformation of the graph of FIG. 3.
Figure 7:
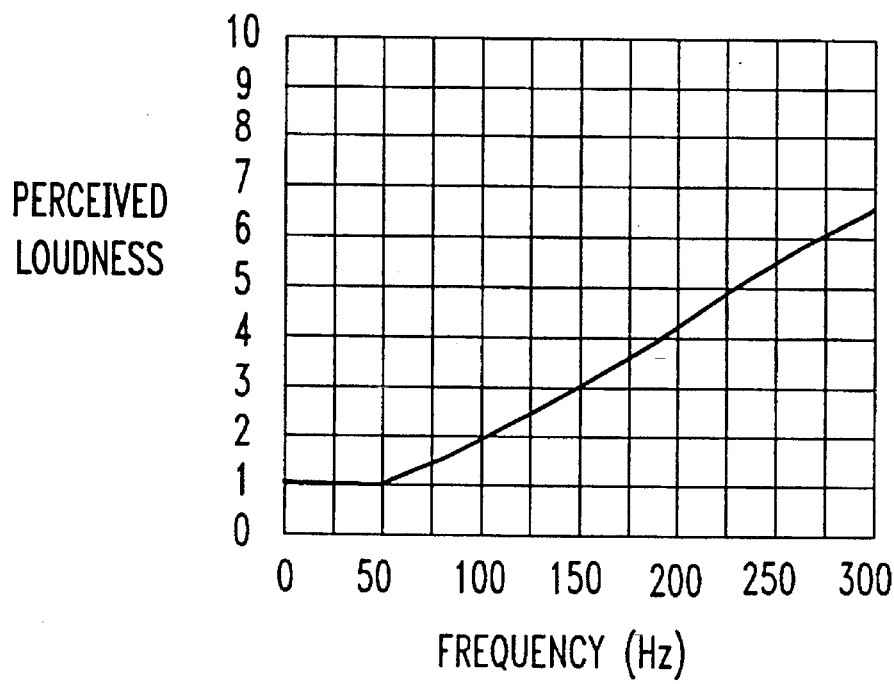
FIG. 7 is a graph of a specific tap corresponding to echo perception, and comprises a loudness transformation of the graph of FIG. 4.

The curves of FIGS. 2–4 are decibel-graduated. To convert these to a proper weighting function for the least-squares framework, the scales must be offset to bring all values to at or above 0 dB. Then, (2) is used to transform the sensitivity readings to the desired loudness scale. The final weighting function is formed by combining multiplicatively one or more individual such functions. FIGS. 5, 6 and 7 show loudness transformations of the sensitivity curves of FIGS. 2, 3 and 4 respectively. These data may then be used to design improved tap profiles.

Figure 8:
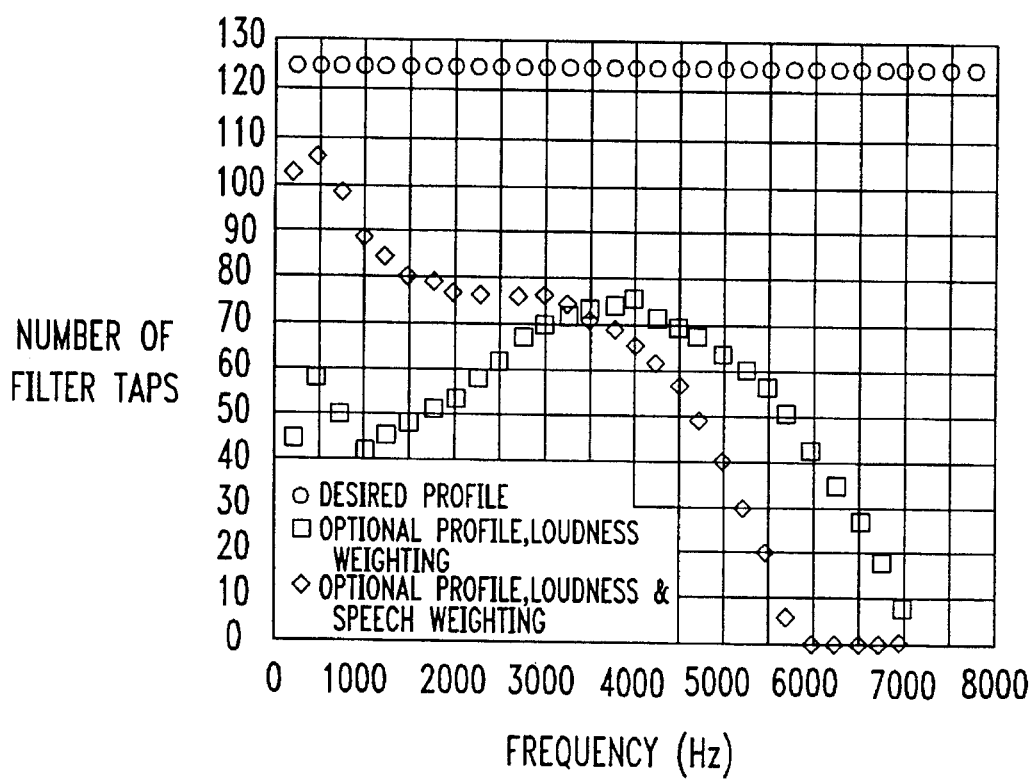
FIG. 8 is a chart illustrating the invention's improvements upon an exemplary desired uniform filter tap profile.

One such tap profile design is based on a desired uniform (flat) profile depicted in FIG. 8, which shows a plot for a uniform echo path compensation of 250 msec (for 2 msec per tap granularity). The size of this profile in number of taps is 3500 (28*125), which is significantly greater than the number of taps economically feasible in typical current hardware implementations. FIG. 8 shows two optimal tap designs for this desired profile. The first uses only the hearing sensitivity weighting function of FIG. 6. The second uses a composite (specifically, a product) of hearing sensitivity as in FIG. 6 and the long-term speech power weighting as in FIG. 5. Because in this example the desired profile is flat, the echo perception weighting is not applicable: that is, all subbands are weighted equally with respect to echo annoyance. Considering the optimal profile for hearing sensitivity weighting only, it is seen that the optimal profile reflects the shape of FIG. 6. As a result, the bulk of the available taps are concentrated in the mid-band region where hearing is most sensitive. When the long-term speech power weighting function is combined with the hearing sensitivity weighting function, a marked bias toward the lower subbands occurs. A small hump in the optimal profile in the mid-band region remains, as a result of pronounced hearing sensitivity weighting in this region.

Figure 9:
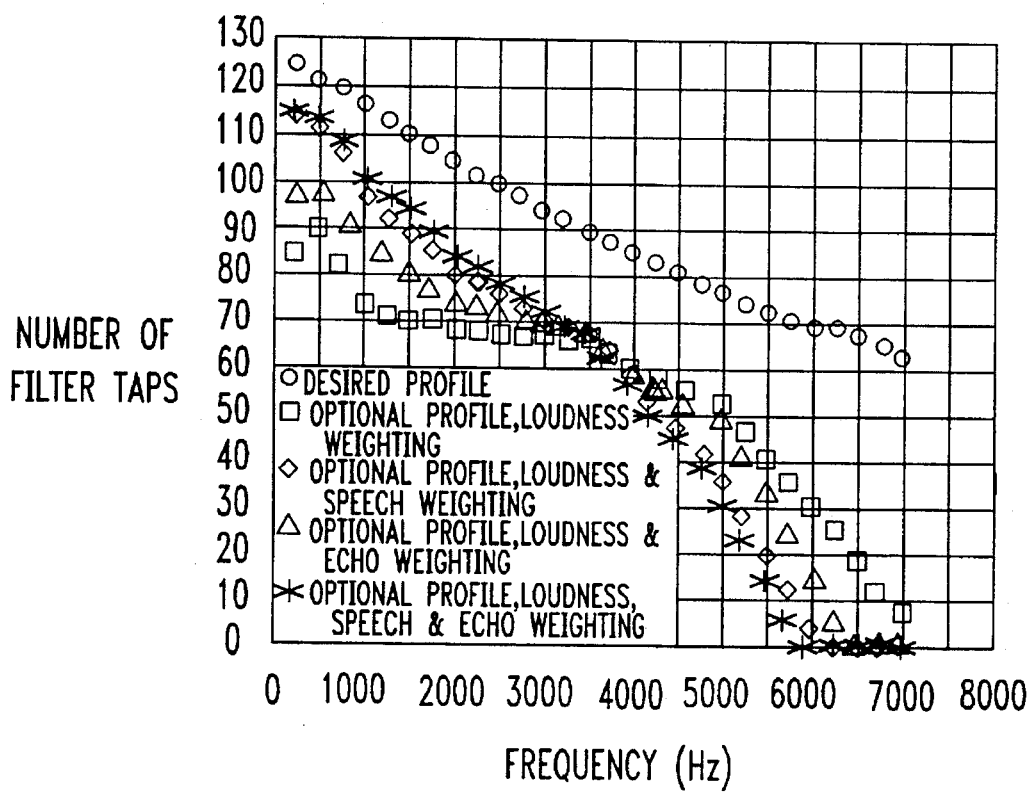
FIG. 9 is a chart illustrating the invention's improvements upon an exemplary modeled filter tap profile.

A second example of an improved tap profile is illustrated in FIG. 9 wherein there are 2550 total taps in the desired tap profile. This profile was derived from measurements on a small collection of typical rooms and represents an approximate bound on the −60dB reverberation level for these rooms as a function of frequency. This −60dB response boundary of the impulse response happens to decay essentially monotonically in frequency, and the reverberation time along this contour is approximately coincident with the desired profile plotted in FIG. 9.

For this desired profile, four optimal filter tap designs were performed, the results of which are also shown in FIG. 9 (contrasting graphics are used to differentiate the separate designs). The first two designs use the same weightings as the two designs in the preceding example. The third design uses a composite of hearing sensitivity as in FIG. 6 and echo perception as in FIG. 7. The fourth design uses a composite of hearing sensitivity as in FIG. 6, speech power weighting as in FIG. 5 and echo perception as in FIG. 7. The echo perception weighting is applicable in this second example because the desired filter tap profile is non-uniform.

Figure 10:
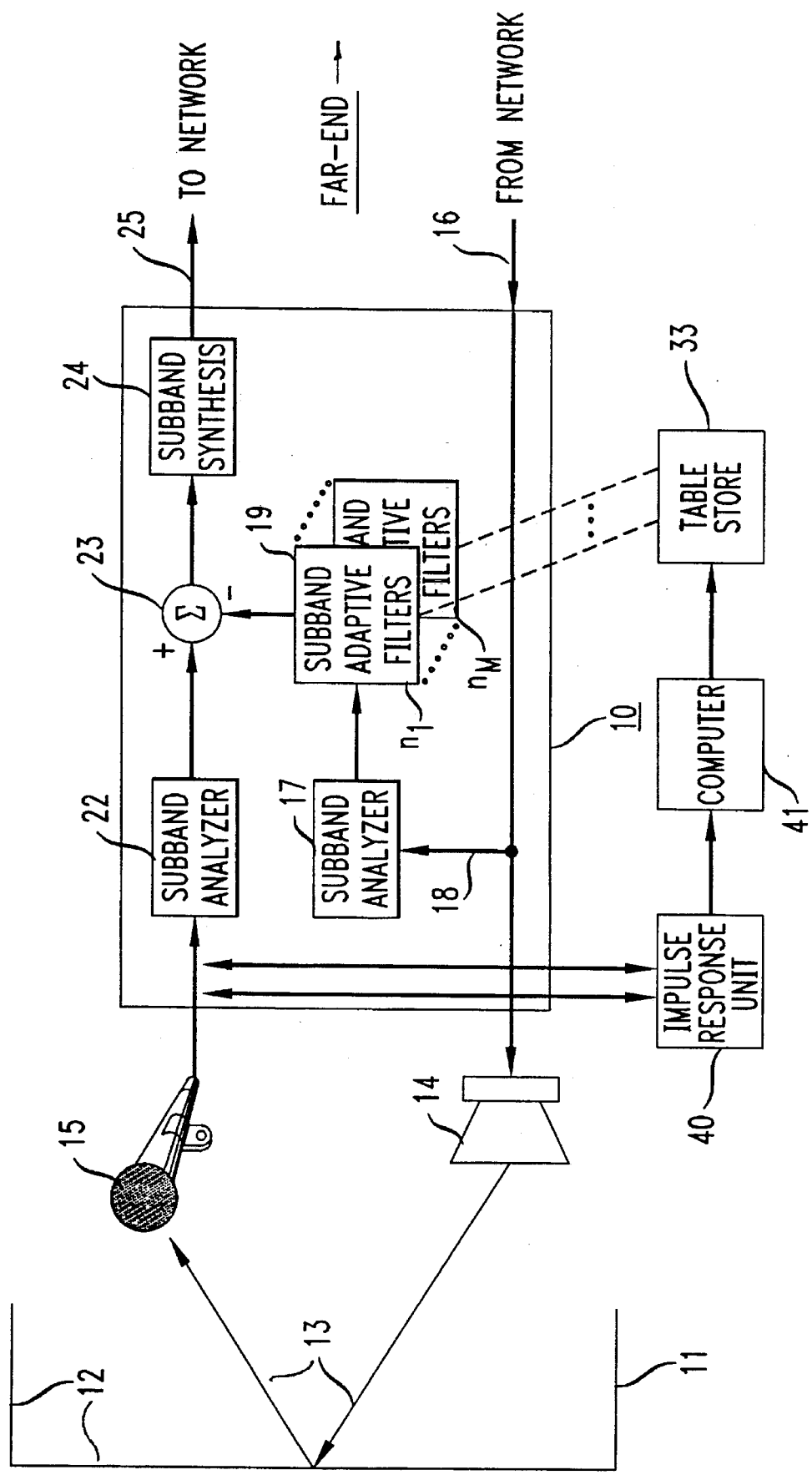
FIG. 10 is a functional diagram similar to FIG. 1, with improvements added according to the invention.

The designs resulting from the hearing sensitivity weighting and combined hearing and speech weightings show results similar to those achieved for the uniform (flat) profile design of the first example. Importantly, the third and fourth designs of the second example, which combine additionally the echo perception sensitivity weighting, show a subtle but real effect of the impressing upon the tap profile design the human ear's sensitivity to echoes of longer delay: that is, the profile is advantageously further skewed toward the lowermost subbands. A generalized machine-implementable configuration for performing the above-described optimization for a subband echo canceller servicing a given room in accordance with the invention, is shown in FIG. 10. Similar in functionality to FIG. 1, the machine also includes a computational unit 41 which hosts in software a set of subroutines executing the optimization procedure already described. Three further quantities are required to compute the optimal filter tap profile. These are: the room acoustic impulse response as a function of time (delay) and frequency as measured over the time-frequency range for which the echo canceller cancels echos; the total number of feasible subband adaptive filter taps, $N_T$, in (1) that can be accommodated by the echo canceller; and a stored list of weights $\{w_i\}$ to be included in (1) representing the composite perceptual loudness weighting functions used in the optimization. The room acoustic impulse response function can be measured locally automatically by the addition of an impulse response test unit 40 shown in FIG. 10 which may implement any of a number of well-known room impulse response measurement techniques such as that described, for example, in the noted publication of Davis et. al. With the addition of unit 40, the room impulse response can also be adjusted periodically to update for numerous possible short-term physical changes in the room such as the presence of conferees, presentation props, the drawing of window drapes, etc., all of which affect the room's acoustic properties. If the added computational requirement of test unit 40 is not economically practical, the room acoustic impulse response function may be supplied using data on standard conferencing rooms as in the earlier examples.

The impulse response then is condensed to the desired tap profile by appropriate computations in computer unit 41 resident in the canceller 10, yielding the term $\{d_i\}$ in expression (1). Next, the optimum tap profile $\{n_i\}$ is computed using a selected stored weight list containing terms $\{w_j\}$. Finally, the computed $\{n_i\}$ are assigned to the subband adaptive filters $\{n_i\}$ of the echo canceller.

One advantageous specific hardware implementation of the functionalities described above may use one or more digital signal processors such as the WE DSP32C available from AT&T, Inc. This and like DSP devices can host the Subband Acoustic Echo Canceler filter tap profile optimization process software, as well as perform the above procedures. One specific design adaptable to practice the present invention using digital signal processors, is the design shown in FIG. 8 of the article entitled "Acoustic Echo Cancellation Using Multirate Techniques", IEICE Transactions, Perez, H. and Amano, F. Vol. E 74 No. 11 November 1991; which is hereby incorporated by reference.

Figure 11:
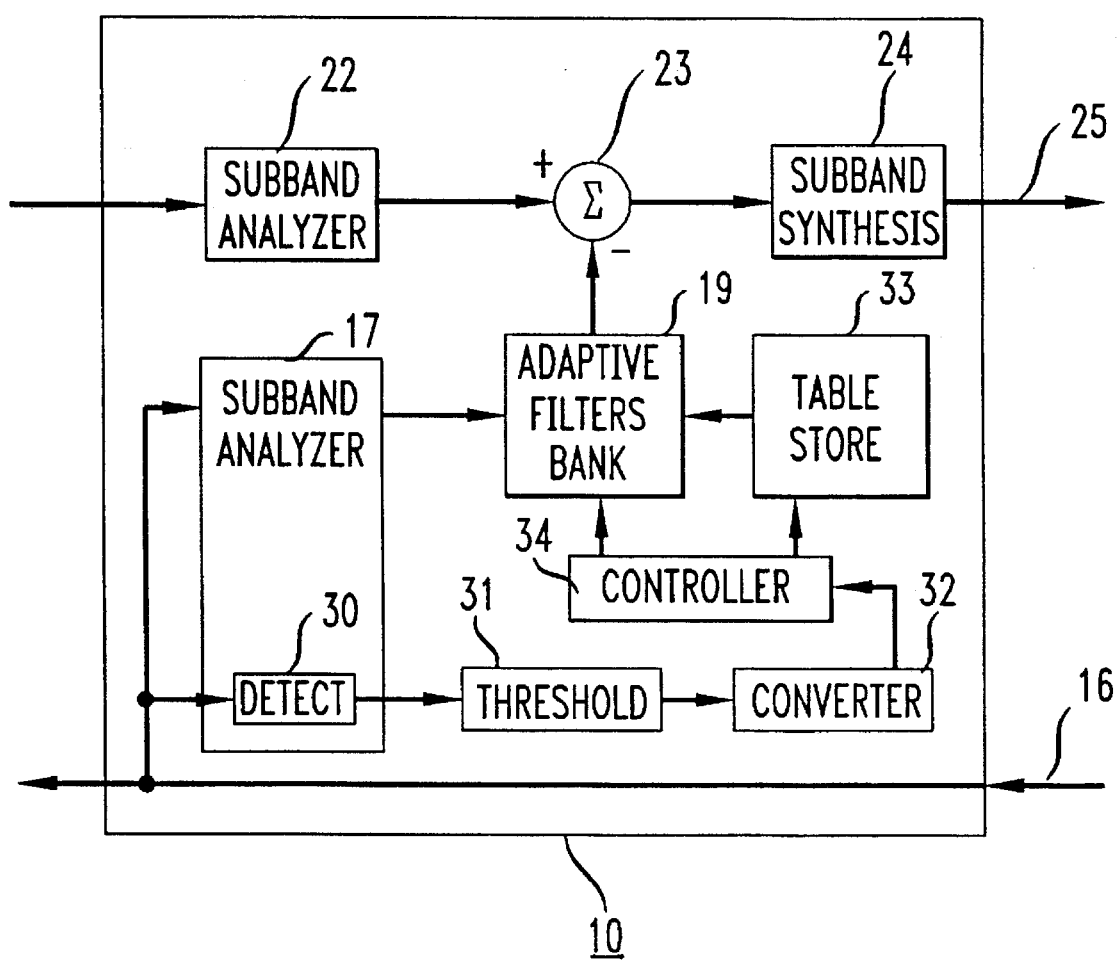
FIG. 11 is a block diagram of an active circuit for further improving filter tap profile to eliminate certain short-term speech components from acoustic echo.

In accordance with a further aspect of the invention, the short-term unvoiced sibilants ('s' sounds) generated in real time by the far-end speaker, which are a frequent contributor to annoying return echo, can be effectively reduced using a variation of the preceding techniques. Sibilant energy is characterized by a relatively unique waveform signature containing short-duration, high-energy bursts in the frequency range of from about 2000 to 5000 Hz. The presence of sibilant energy may therefore be detected in real time in the appropriate subbands, and additional filter tap adjustments made by impressing onto the tap weighting $\{w_i\}$ for the high frequency subbands additional weightings for the duration of the sibilant peak, in a manner similar to that described with respect to FIGS. 5–7. These weightings may be constructed using published or measured information on sibilant energy content in telecommunications conferencing systems far-end speech. Alternatively, the sibilant energy content of the far-end speaker's voice may be actively measured and real-time active tap adjustments made in affected subbands as a function of the measured sibilant peak values. FIG. 11 shows a variation of the subband analyzer 17 of FIG. 1 which practices this concept. It comprises a detector 30 for determining presence of sibilant energy by measuring, for example, the near-instantaneous power level of the sibilant energy burst within its spectrum. A threshold circuit 31 determines when the relative power of the sibilant energy is at or above a certain value with respect to the power in the remaining spectrum or some portion thereof, and generates a trigger signal in response thereto. The adaptive filter tap weightings which drive the individual taps of the adaptive filter bank 19, and which are previously set at the values for any of the examples above, are stored in a table store 33 which is a local data base integral with the canceller 10. In response to a trigger signal from threshold circuit 31, the power level indicia of the sibilant energy in the various detection subbands is forwarded to converter 32 where the indicia are converted to tap weighting value adjustments. These are then forwarded to a controller 34 which momentarily reallocates the subband taps in adaptive filter bank 19 to concentrate more filtering in the detected sibilant frequency range. Controller 34 also places the additional weights into store 33 which re-optimizes the weightings to include the sibilant adjustments. When the sibilant energy burst passes, the detector 30 and threshold circuit 31 deactivate and the tap allocation and weights are returned to their normal values and configurations. This adjustment occurs whenever sibilant energy of sufficient power is detected.

Figure 12:
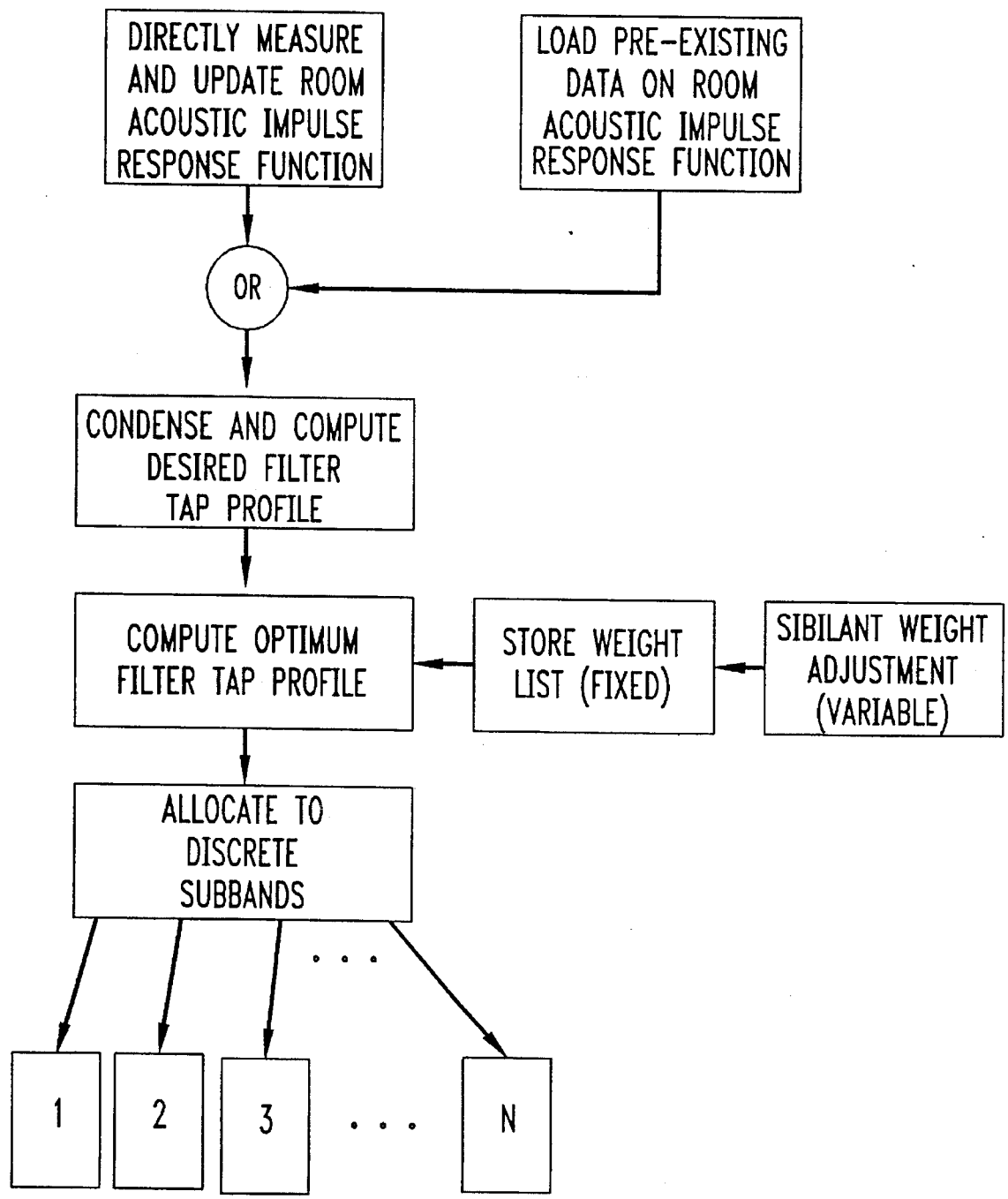
FIG. 12 is a process diagram summarizing the data processing steps of the invention.

A process flow chart demonstrating the combining of the preceding overall steps is found in FIG. 12.

I claim:

1. A subband acoustic echo canceler for a teleconferencing room hands-free audio telecommunications system, said system being connected to a far-end telecommunications station through incoming and outgoing signal paths, said room having an acoustic impulse response function with a component thereof being associated with each said subband, said subband acoustic echo canceler comprising:

a fixed number of adaptive filter taps associated with said subband acoustic echo canceler; and means for allocating said adaptive filter taps among individual ones of said subbands, said allocating means comprising:

a data store connected to said adaptive filter taps allocating means;

means for inputting to said data store a first set of data comprising said component of said room acoustic impulse response function associated with each said subband;

means for inputting to said data store a second set of data comprising predetermined speech power spectra for male and female speakers, said speech power spectra having peak energy regions in frequency ranges contained by subbands of relatively lower frequency ranges; and means for combining said first and second data sets to construct a tap allocation profile for said subbands which selectively increases the number of said taps in said lower frequency ranges.

2. Apparatus in accordance with claim 1, further comprising means for detecting sibilant spectral energy in said incoming signal path, and means responsive to said detecting of sibilant energy for adjusting said tap allocation profile resulting from said combining of said two said data sets, to momentarily reallocate additional said taps to subbands containing said sibilant spectral energy.

3. Apparatus in accordance with claim 2, further comprising:

means responsive to cessation of detection of said sibilant energy for returning said tap allocation profile to its allocation state at the time prior to detecting of said sibilant energy.

4. A subband acoustic echo canceler for a telecommunications teleconferencing room having incoming and outgoing signal paths connecting said room to one or more far-end stations, said echo canceler comprising:

a fixed plurality of subband adaptive filters;

a plurality of adaptive filter taps associated with said subbands;

a data store connected to said adaptive filter taps, said data store containing a weight list for controlling allocation of said taps among said subbands;

means for estimating the acoustic impulse response of said room and for condensing said impulse response into entries onto said weight list to create a subband filter tap profile;

means for adjusting said filter tap profile using one or more measures of perceived human acoustic sensitivity experienced by the far-end users;

means for applying said adjusted tap profile to said subband adaptive filters of said echo canceler, thereby to allocate said fixed number of taps among said subbands;

means for detecting sibilant energy in said incoming path and for measuring its power spectra; and means for converting said detected sibilant energy power spectra into a further adjustment of said weight list, thereby to increase for the duration of said detected sibilant energy the number of adaptive filter taps allocated to subbands having frequencies characteristic of said sibilant energy power spectra.

5. Apparatus in accordance with claim 4, wherein said one or more measures of perceived human acoustic sensitivity comprises predetermined speech power spectra, thereby to concentrate a higher proportion of said fixed number of filter taps in subbands operating at frequencies at and below substantially 1000 Hz.

6. Apparatus in accordance with claim 5, wherein said one or more measures of perceived human acoustic sensitivity further comprises indicia of human hearing sensitivity weightings.

7. Apparatus in accordance with claim 5, wherein said one or more measures of perceived human acoustic sensitivity further comprises the product of indicia of human hearing sensitivity weighting and of long-term speech power weighting.

8. Apparatus in accordance with claims 4, 5, 6 or 7, further comprising means for impressing onto said data store weight list indicia of echo perception weightings representative of the human ear's sensitivity to return echoes received by a talker at said far-end station which have in excess of substantially 50 milliseconds of delay.

9. An echo canceler in accordance with claim 9, further comprising means for actively periodically measuring the acoustic impulse response of said room and for condensing said impulse response to said subband filter tap profile.

* * * * *